(12) United States Patent
Chura

(10) Patent No.: US 6,594,944 B2
(45) Date of Patent: Jul. 22, 2003

(54) METHOD AND APPARATUS FOR ATTRACTING AND COLLECTING INSECTS

(76) Inventor: Daniel Chura, Box 4, Group 23, East Selkirk, Manitoba (CA), R0E 0M0

( * ) Notice: Subject to any disclaimer, the term of this patent is extended or adjusted under 35 U.S.C. 154(b) by 0 days.

(21) Appl. No.: 10/098,175

(22) Filed: Mar. 15, 2002

(65) Prior Publication Data

US 2002/0129540 A1 Sep. 19, 2002

Related U.S. Application Data

(60) Provisional application No. 60/276,118, filed on Mar. 16, 2001.

(51) Int. Cl.$^7$ ............................. A01M 1/02; A01M 1/22
(52) U.S. Cl. ............................................. 43/98; 43/112
(58) Field of Search ............................... 43/98, 107, 112

(56) References Cited

U.S. PATENT DOCUMENTS

| | | | |
|---|---|---|---|
| 4,506,473 A | | 3/1985 | Waters, Jr. .................. 43/107 |
| 4,519,776 A | * | 5/1985 | DeYoreo et al. ............. 251/11 |
| 5,669,176 A | | 9/1997 | Miller ...................... 43/107 X |
| 5,799,436 A | * | 9/1998 | Nolen et al. ................. 43/112 |
| 6,055,766 A | | 5/2000 | Nolen et al. ................. 43/112 |
| 6,145,243 A | * | 11/2000 | Wigton et al. ............... 43/107 |

FOREIGN PATENT DOCUMENTS

CA  2322038  7/1999

* cited by examiner

Primary Examiner—Robert P. Swiatek
(74) Attorney, Agent, or Firm—Ryan W. Dupuis; Adrian D. Battison; Michael R. Williams

(57) ABSTRACT

An apparatus for collecting insects comprising (i) a source of propane, (ii) a propane burner arranged to combust propane from the source of propane so as to produce carbon dioxide and water vapor as products of combustion for attracting insects, and (iii) an insect collector located in proximity to the propane burner for collecting insects attracted to the propane burner. The use of a propane burner provides the desired products of combustion including carbon dioxide and water vapor as well as heat for mimicking the breathing of animals to attract biting insects using readily available propane tanks. The convection of heat from the propane burner is further beneficial because a flow of carbon dioxide and water vapor through the collector may be achieved without the additional requirement of fans or any other complex arrangement of parts. The collector may comprise an electrical grid which does not require a light for attracting insects as do conventional electrical grids for pest control.

15 Claims, 2 Drawing Sheets

METHOD AND APPARATUS FOR ATTRACTING AND COLLECTING INSECTS

This application claims the benefit of U.S. Provisional Application Ser. No. 60/276,118 filed Mar. 16, 2001.

FIELD OF THE INVENTION

The present invention relates to a method and apparatus for collecting insects and more particularly to a method and apparatus for generating carbon dioxide as an attractant for collecting insects of the type which are attracted to carbon dioxide.

BACKGROUND

Insects are known to be an annoyance, particularly biting insects including mosquitoes and the like. The resulting bites from these insects can be irritating to the skin and cause further annoyance from itching and mild pain resulting from the bite. It is thus well known and desirable to trap or exterminate such insects using some form of insect collecting device.

A known device for killing insects includes an electrified grid which is arranged to form a high voltage arc across an insect which flies through the grid. A light is provided to attract the insects to fly through the electrified grid while the grid electrifies the insects and kills them as the do so. Although being somewhat effective at killing biting insects the device is also known to attract other animals and desirable insects like moths for example.

Another known practice for exterminating insects includes the use of pesticides. The use of pesticide however inadvertently kills beneficial insects and animals. Furthermore the chemical used in pesticides are generally known to be unhealthy for surrounding persons and the surrounding environment.

Other known pest control devices have been known to use carbon dioxide as an attractant for biting insects including mosquitoes and the like, in combination with a trap. Carbon dioxide is used to mimic the biological functions of animals and more particularly the breathing of such animals which the insects are known to seek.

U.S. Pat. No. 4,506,473 to Waters Jr. provides a carbon dioxide generator insect attractant for use with an insect trap. The carbon dioxide is generated by reacting a carbonate salt with an aqueous acid solution. In addition to not being a readily available source of carbon dioxide, the use of such chemicals may be toxic or harmful to children or animals such as pets in the surrounding environment.

U.S. Pat. No. 5,669,176 to Miller provides an insect trap including a methanol fuel cell for generating carbon dioxide, water vapour and heat as attractants. The trap includes a complex arrangement of pumps and fans which is costly and difficult to assemble and maintain. Furthermore it is difficult and awkward to recharge the trap because methanol is not a readily available fuel source and because fuel cells are not widely used such that the general public is not familiar with the arrangement of the trap.

SUMMARY

According to one aspect of the present invention there is provided an apparatus for collecting insects comprising:

a source of propane;

a propane burner arranged to combust propane from the source of propane so as to produce carbon dioxide and water vapour as products of combustion for attracting insects; and an insect collector located in proximity to the propane burner for collecting insects attracted to the propane burner.

The use of a propane burner provides the desired products of combustion including carbon dioxide and water vapour as well as heat for mimicking the breathing of animals to attract biting insects. Propane is a readily available fuel and is commonly supplied in tanks for barbecues and the like such that recharging the apparatus with fuel is a simple and well known task. The convection of heat from the propane burner is further beneficial because a flow of carbon dioxide and water vapour through the collector may be achieved without the additional requirement of fans or any other complex arrangement of parts.

The collector preferably comprises an electrified insect exterminating grid arranged to produce an arc when an insect is located adjacent to the grid for exterminating the insect. The grid thus collects insects by killing them so that the insects are deposited therebelow. When the propane burner is used in combination with an electrified grid, the grid does not require a light source as in conventional grids of this type such that further beneficial insects are not inadvertently killed. In further arrangements, the collector may comprise any type of insect trap for collecting the insects in place of the grid.

There may be provided a container mounting the burner therein having an exhaust port for exhausting the products of combustion therefrom, the collector being located adjacent the exhaust port of the container.

A flow regulator is preferably coupled between the source of propane and the burner, the flow regulator being arranged to control a temperature of the products of combustion passing through the exhaust port.

The exhaust port is preferably located adjacent a top end of the container.

The collector may comprise an exhaust cage which fully encloses the exhaust port, the exhaust cage defining the electrified grid for exterminating the insects.

There may be provided a tubular exhaust member which extends from an inner end coupled to the exhaust port to an outer end located centrally within the exhaust cage.

The inner end of the exhaust member preferably comprises an enlarged and tapered mouth coupled to the exhaust port.

At least one inlet port is preferably located in the container adjacent the burner therein.

There may be provided an ignitor mechanism coupled to the burner.

There may be provided a shield mounted above the burner and the grid.

A cage preferably surrounds the grid for preventing access to the grid by unauthorised persons.

The source of propane, the burner and the grid may be supported on a wheeled cart for portability.

There may be provided an attachment for coupling a conventional propane tank thereto.

A light diffuser may be provided for enclosing the burner for diffusing light emitted by combustion of propane.

A humidifier may also be includes which is arranged to release water vapour in proximity to the propane burner to assist in attracting biting insects.

According to a further aspect of the present invention there is provided a method of collecting insects comprising:

providing an insect collector arranged to collect insects;

providing a source of propane;

combusting the propane in proximity to the insect collector so as to produce carbon dioxide and water vapour as products of combustion for attracting insects to the insect collector.

The collector preferably comprises an electrified insect exterminating grid arranged to produce an arc when an insect is located adjacent to the grid for exterminating the insect.

The method may include enclosing the burner within a container having an exhaust port for exhausting the products of combustion therethrough and mounting the collector adjacent the exhaust port.

The method may also include enclosing the exhaust port with the insect exterminating grid.

The method preferably includes coupling a flow regulator to the source of propane and controlling a temperature of the products of combustion exiting the exhaust port by adjusting the flow regulator.

The method may further include diffusing light emitted by the combustion of the propane.

BRIEF DESCRIPTION OF THE DRAWINGS

In the accompanying drawings, which illustrate an exemplary embodiment of the present invention.

DETAILED DESCRIPTION

Figure 1:
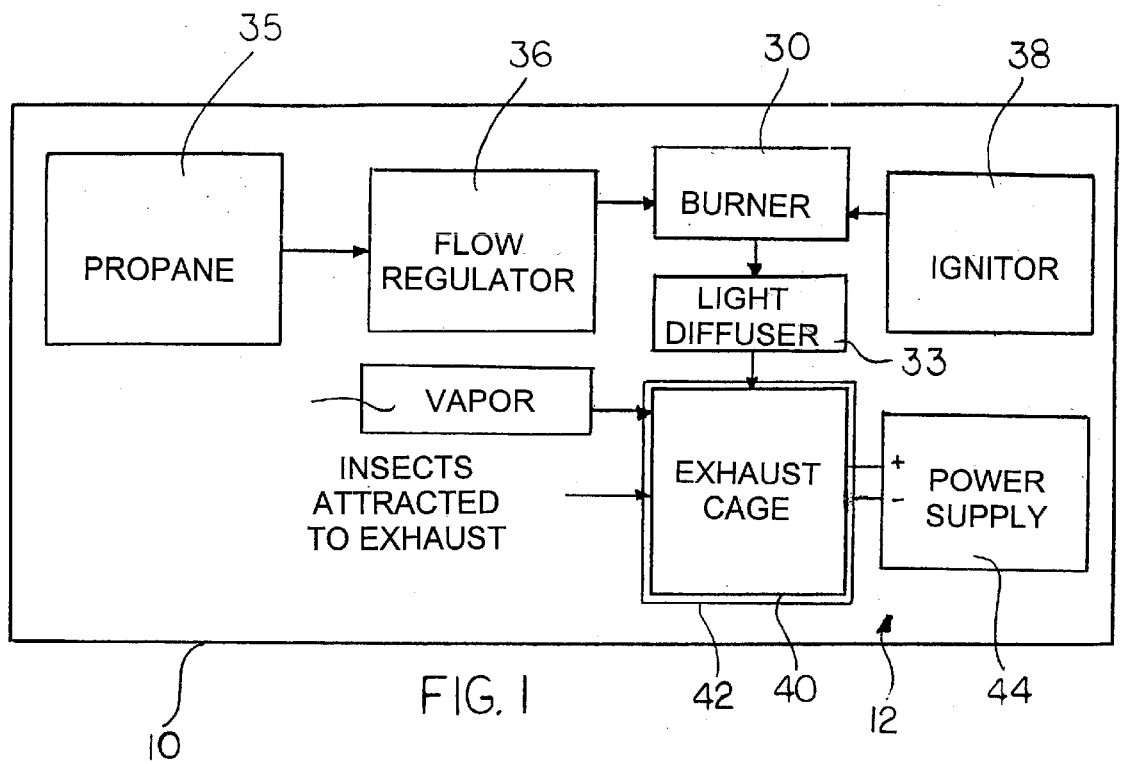
FIG. 1 is a schematic view of the apparatus for exterminating insects.
Figure 3:
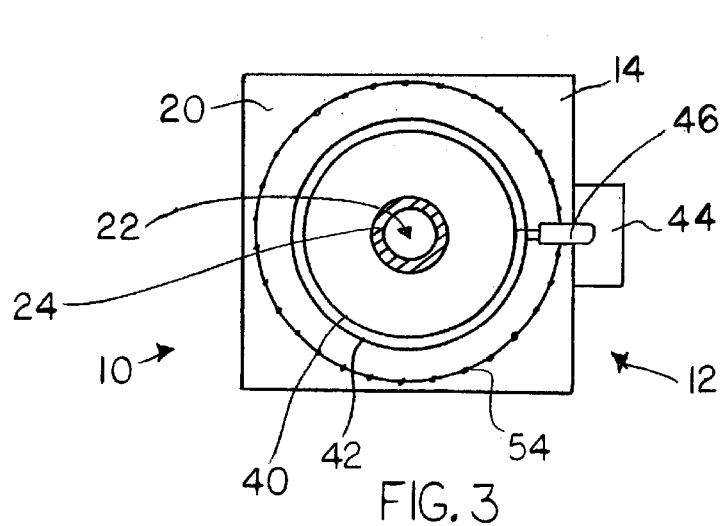
FIG. 3 is a sectional view along the line 3—3 of FIG. 2.
Figure 2:
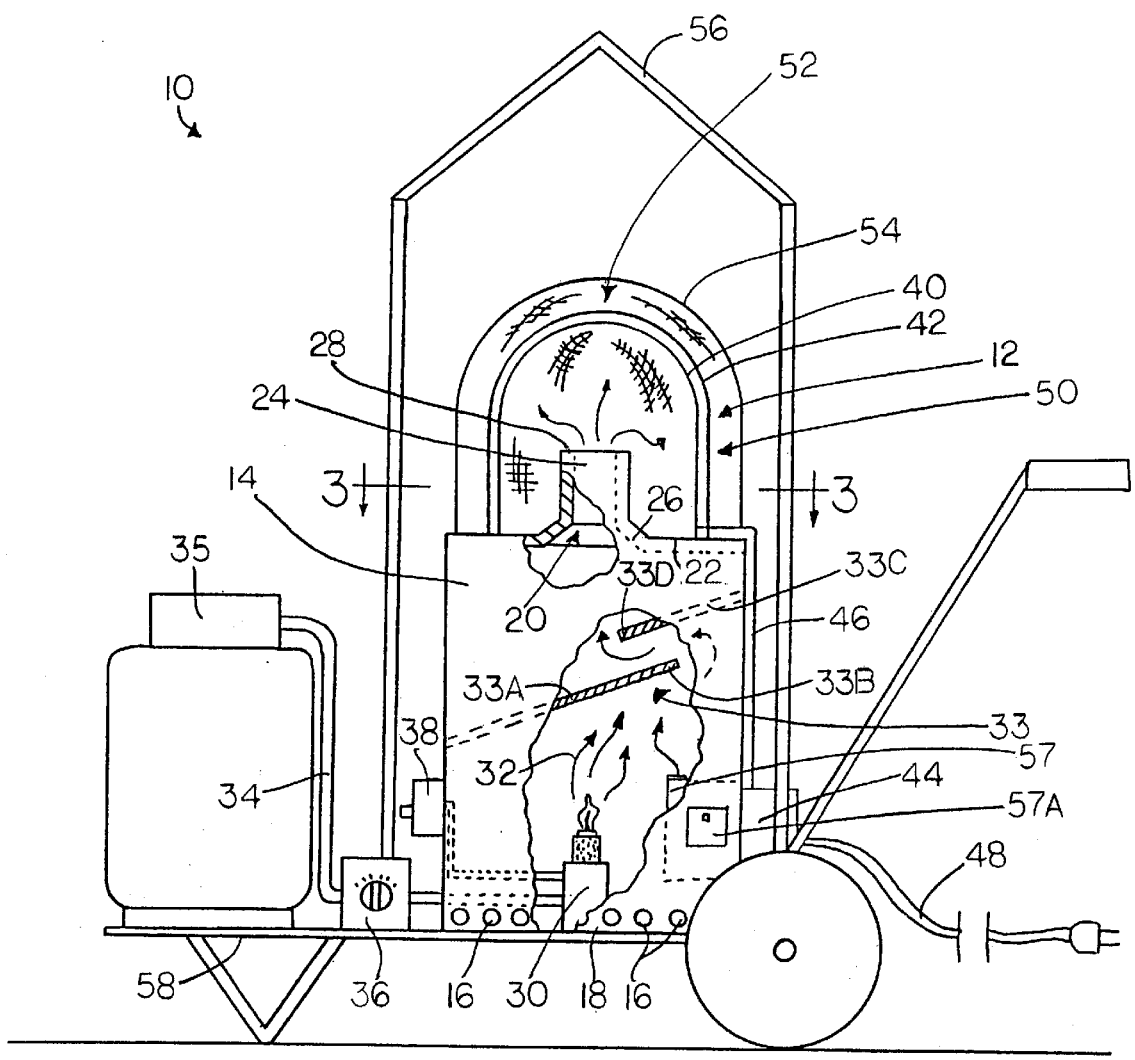
FIG. 2 is a partly sectional side elevational view of the apparatus.

Referring to the accompanying drawings, there is illustrated an apparatus for collecting insects generally indicated by reference numeral 10. The apparatus 10 is arranged to produce carbon dioxide, water vapour and heat as attractants for biting insects and includes an insect collector 12 for collecting the insects attracted thereto.

The apparatus 10 includes a container 14 which is formed of metal and is generally rectangular in shape. The container includes a plurality of inlet ports 16 which are spaced about a periphery of the container adjacent a bottom end 18 thereof. The container 14 further includes an exhaust port 20 centrally located in a top end 22 of the container. The container 14 is fully enclosed with the exception of the inlet port 16 and the exhaust ports 20.

A tubular exhaust member 24 is coupled to the exhaust port 20 and is oriented to extend vertically upward therefrom. The exhaust member 24 extends from an enlarged, tapered mouth located at an inner end 26 of the member coupled to the exhaust port 20 to an outer end 28 spaced upwardly from the top end 22 of the container.

A propane burner 30 is mounted centrally within the inner chamber of the container 14 adjacent the bottom end 18 of the container. The inlet ports 16 are thus located adjacent the burner 30 for providing fresh combustion air to the burner. The burner 30 is positioned directly below the exhaust port 20 such that heat and products of combustion generated by the burner are convected upwardly as indicated by flow lines 32 to exit the exhaust port 20 while fresh combustion air is drawn in through the inlet ports.

The container surrounding the burner 30 includes a light diffuser 33 supported therein partway between the burner 30 at the bottom of the container and the exhaust port 20 at the top end of the container. Products of combustion from the burner must past through the light diffuser, which fully spans the walls of the container, in order to reach the exhaust port 20. The light diffuser 33 is arranged to diffuse light produced by combustion of the propane at the burner so that insects such as moths are not attracted by the light, but rather only biting insects are attracted by the products of combustion of the propane.

The light diffuser includes a first diffuser member 33A, in the form of a plate spanning a central portion of the inner chamber of the container above the burner and fully spanning the opening of the exhaust port 20 spaced therebelow. The first diffuser member 33A extends at an upward incline to a free end 33B which terminates partway across container spaced inwardly from the walls of the container to permit rising products of combustion to be deflected about the free end of the first diffuser member towards the exhaust port 20. A second diffuser member 33C spans inwardly from the walls of the container, above the free end 33B of the first diffuser member 33A. The second diffuser member overlaps the first diffuser member and terminates at a free end 33D which is located below the exhaust port 20 such that products of combustion deflected about the free end 33D, subsequently rise directly upward to the exhaust port. Together with the container, the light diffuser fully surrounds the burner to restrict the escape of light from the burning propane.

A supply line 34 is coupled to the burner 30 and includes an attachment on an outer free end thereof which is suitable for a connection to a conventional propane tank 35 of the type which is readily available for barbecues and the like.

A flow regulator 36 is mounted in series with the supply line 30 between the attachment for the propane tank 35 and the burner 30. The flow regulator 36 controls the amount of propane which is combusted by the burner 30 thus controlling the amount of heat and products of combustion generated by the burner for dispensing through the exhaust port 20. The flow regulator is adjusted such that the flow of products of combustion exiting through the exhaust port 20 is approximately 39 degrees Celsius to simulate a person's breath. The flow regulator 36 may be preset when the apparatus is manufactured at the factory or may remain adjustable for use in differing climates.

An ignitor 38 is mounted on an outer side of the container 14 and is coupled to the burner 30 located within the container. In this arrangement the burner may be ignited remotely and externally from the container 14 without opening the container. The ignitor 38 is similar to a conventional ignitor mechanism commonly found on propane barbecues and the like.

The insect collector 12 comprises an electrified insect exterminating grid including an inner cage 40 and an outer cage 42. The inner and outer cages 40 and 42 are coupled to opposing terminals of a power source 44 through an electrical conduit 46 for electrically charging the cages. A plug 48 is provided on the power source for connection to a conventional electrical outlet.

The inner and outer cages 40 and 42 are mounted in a parallel relationship and spaced sufficiently so that no arcing between the two will result until an insect is located therebetween to act as a bridge for an arc between the cages to effectively electrocute and kill the insect so as to collect the insect on a top side of the container. The cages are formed of a conductive mesh material having a sufficiently large mesh spacing so as to permit insects to pass therethrough.

The inner and outer cages 40 and 42 each include a cylindrical portion 50 which is mounted on the top end of the container 14 to extend upwardly therefrom concentrically about the exhaust member 24. A dome portion 52 encloses the top end of each cylindrical portion 50. In this arrangement the inner and outer cages define an exhaust cage which fully surrounds the exhaust member 24 such that an insect must pass through the respective inner and outer cages in order to reach the exhaust member 24 located therein.

The exhaust member 24 and the inner and outer cages 40 and 42 are arranged such that the outer end 28 of the exhaust member is centrally located within the exhaust cage formed by the inner and outer cages 40 and 42. The resulting highest concentration of carbon dioxide and water vapour will be located centrally within the exhaust cage with concentrations decreasing with increased distance from the exhaust member 24.

A safety cage 54 similar in shape to the inner and outer cages 40 and 42 extends about the respective cages spaced outwardly therefrom. The safety cage 54 prevents access to the inner and outer cages 40 and 42 by unauthorized persons so as to reduce the likelihood of children or pets injuring themselves.

A shield 56 is mounted above the burner 30 and the collector 12 for protection against the elements such as rain. The shield 56 is spaced upwardly from the inner and outer cages 40 and 42 and spans laterally sufficiently to fully cover both inner and outer cages 40 and 42 as well as the exhaust port 20 of the container.

A humidifier 57 is located within the container 14 adjacent the burner 30 for adding additional water vapour to the rising products of combustion. The humidifier is powered by the common power source 44 of the apparatus. An access door 57A is provided in a side wall of the container which permits a supply tank in the humidifier 57 to be readily filled with water as desired which continues to vaporise the water to be added to the rising products of combustion. In some embodiments, the humidifier may simply comprise a fillable container of water which is positioned sufficiently close or adjacent to the burner such that heat from the combustion of propane by the burner assists in evaporating the water to produce water vapour added to the products of combustion.

The container 14 and insect collector 12 mounted thereon are supported on a wheeled cart 58 for portability. The cart further includes a deck which is arranged to support the propane tank 35 thereon.

In use a person first connects a conventional propane tank 35 to the supply line 34 of the apparatus and subsequently opens the corresponding valve on the tank to supply propane to the burner 30. The burner 30 may then be ignited to commence combustion of the propane. The combustion of propane consumes oxygen which is supplied through the inlet ports 16 so as to produce carbon dioxide and water vapour as products of combustion as well as heat.

The heat generated causes the products of combustion to rise and exit through the exhaust member 24 without the need of a fan or the like. The flow regulator 36 may be adjusted as desired to optimize the temperature for mimicking the breathing functions of an animal. Plugging in the power source 44 provides power to the cages 40 and 42 to electrocute any bugs which are attracted to the concentration of carbon dioxide, water vapour and heat within the inner and outer cages 40 and 42. The wheeled cart 58 allows the apparatus to be positioned in concentrated areas of insects as desired so as to be most effective in eradicating the insects.

While one embodiment of the present invention has been described in the foregoing, it is to be understood that other embodiments are possible within the scope of the invention. The invention is to be considered limited solely by the scope of the appended claims.

What is claimed is:

1. An apparatus for collecting insects comprising:
   a source of propane;
   a propane burner arranged to combust propane from the source of propane so as to produce carbon dioxide and water vapour as products of combustion for attracting insects;
   a container mounting the burner therein having at least one exhaust port for exhausting the products of combustion therefrom; and
   an exhaust cage which surrounds the container and encloses said at least one exhaust port such that the products of combustion are exhausted through the exhaust cage, the exhaust cage comprising an electrified grid arranged to produce an arc when an insect is located adjacent the grid for exterminating the insect.

2. The apparatus according to claim 1 wherein there is provided a flow regulator coupled between the source of propane and the burner, the flow regulator being arranged to control a temperature of the products of combustion passing through said at least one exhaust port.

3. The apparatus according to claim 1 wherein said at least one exhaust port is located above the burner.

4. The apparatus according to claim 1 wherein there is provided a tubular exhaust member which extends from an inner end adjacent the burner to an outer end located centrally within the exhaust cage.

5. The apparatus according to claim 4 wherein the inner end of the tubular exhaust member comprises an enlarged and tapered mouth coupled to the exhaust port.

6. The apparatus according to claim 1 wherein there is provided at least one inlet part in the container adjacent the burner therein.

7. The apparatus according to claim 1 wherein there is provided an ignitor mechanism coupled to the burner.

8. The apparatus according to claim 1 wherein there is provided a shield mounted above the burner and the grid.

9. The apparatus according to claim 1 wherein there is provided a security cage surrounding the exhaust cage for preventing access to the exhaust cage by unauthorised persons.

10. The apparatus according to claim 1 wherein there is provided a humidifier arranged to release water vapour In proximity to the propane burner.

11. An apparatus for collecting insects comprising:
    a source of propane;
    a propane burner arranged to combust propane from the source of propane so as to produce carbon dioxide and water vapour as products of combustion for attracting insects;
    a container mounting the burner therein having at least one exhaust port for exhausting the products of combustion therefrom; and
    an exhaust cage which surrounds the container and encloses said at least one exhaust port such that the products of combustion are exhausted through the exhaust cage, the exhaust cage comprising an electrified grid arranged to produce an arc when an insect is located adjacent the grid for exterminating the insect;
    the container comprising a light diffuser enclosing the burner for diffusing light emitted by combustion of propane, the light diffuser being arranged to permit passage of the products of combustion therethrough.

12. A method of collecting insects comprising:
    providing an electrified insect exterminating grid arranged to produce an arc when an Insect is located adjacent to the grid for exterminating the insect;

providing a propane burner and a source of propane therefor;

locating the burner within the insect exterminating grid such that the grid fully surrounds exhaust from the burner;

combusting the propane at the burner within the grid so as to produce carbon dioxide and water vapour as products of combustion for attracting insects to the grid.

13. The method according to claim 12 including diffusing light emitted by the combustion of the propane.

14. The method according to claim 12 including locating the grid above the burner.

15. An apparatus for collecting insects comprising:

a source of propane;

a propane burner arranged to combust propane from the source of propane so as to produce carbon dioxide and water vapour as products of combustion for attracting insects;

a container mounting the burner therein having at least one exhaust port for exhausting the products of combustion therefrom; and an exhaust cage which surrounds the container and encloses said at least one exhaust port such that the products of combustion are exhausted through the exhaust cage, the exhaust cage comprising an electrified grid arranged to produce an arc when an insect is located adjacent the grid for exterminating the insect;

said at least one exhaust port and the exhaust cage surrounding said at least one exhaust port both being located above the burner.

* * * * *